May 28, 1940.                J. C. MOCK                2,202,296
                       CONVERTIBLE CAR WHEEL
                       Filed Jan. 28, 1937          2 Sheets-Sheet 1
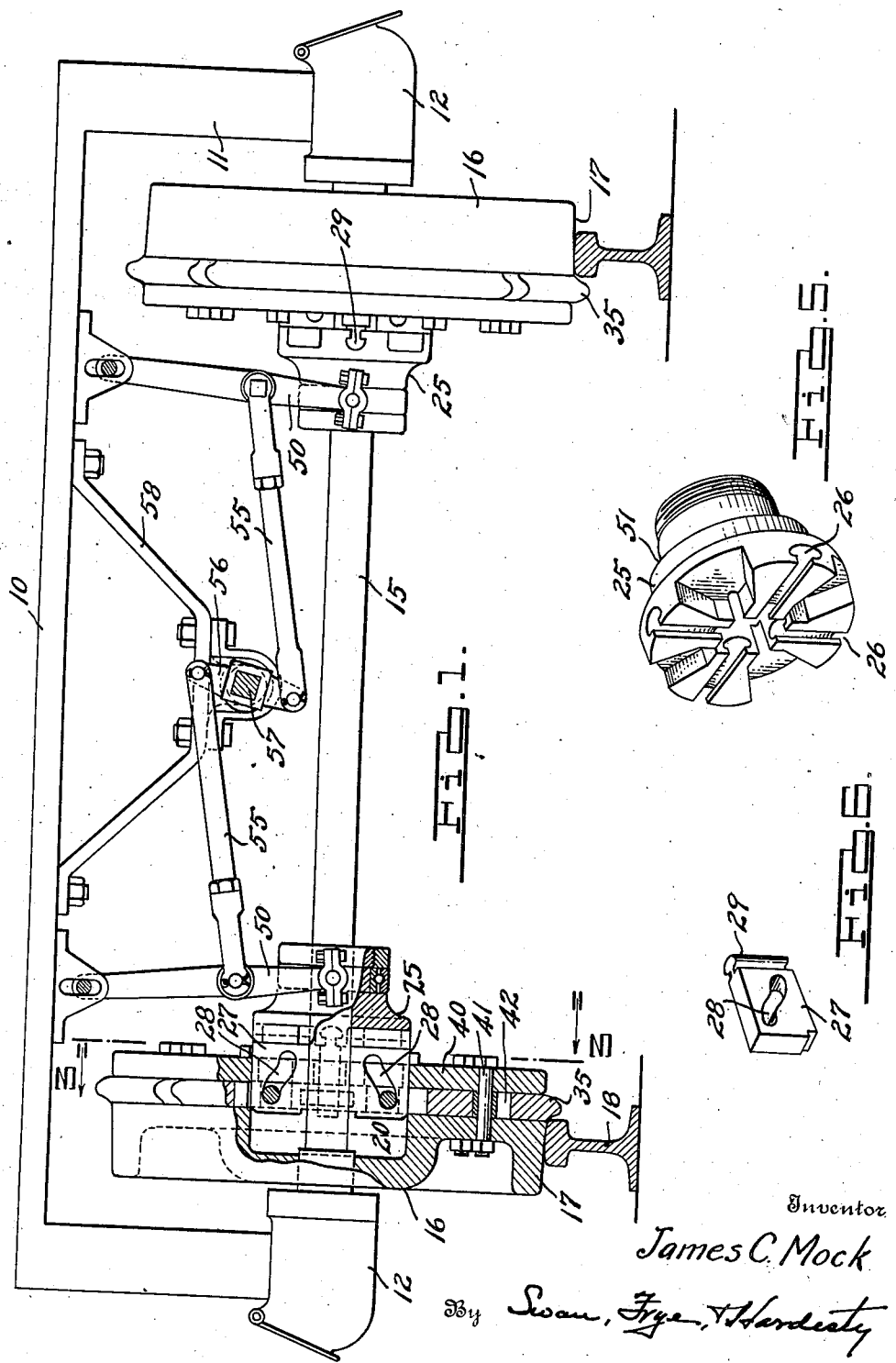
Inventor
James C. Mock
By Swan, Frye & Hardesty
Attorneys May 28, 1940.   J. C. MOCK.   2,202,296
CONVERTIBLE CAR WHEEL
Filed Jan. 28, 1937   2 Sheets-Sheet 2
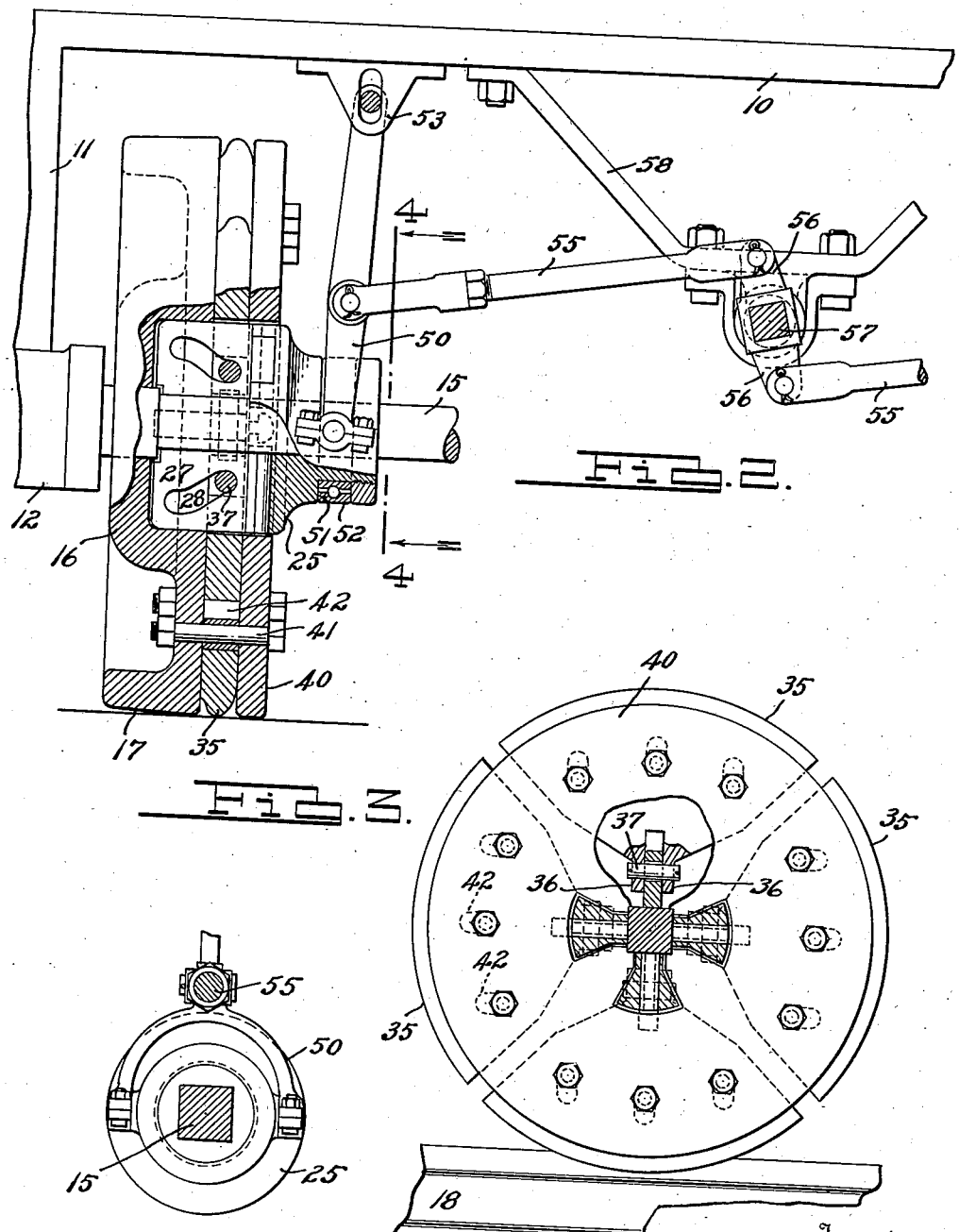
Inventor
James C. Mock
By Swan, Fryer & Hardesty
Attorneys Patented May 28, 1940

2,202,296

UNITED STATES PATENT OFFICE 2,202,296

CONVERTIBLE CAR WHEEL

James C. Mock, Detroit, Mich.

Application January 28, 1937, Serial No. 122,702

1 Claim. (Cl. 295—9)

The present invention relates to rail-car wheels and more specifically to wheels capable of use not only upon the rails of a conventional railroad, but also, upon the flat surfaces of highways or the like.

Among the objects of the invention is a wheel, which when the intended operation is upon rails, is provided with a suitable flange for maintenance of the wheel tread upon the rail, but which flange may be withdrawn so that the tread presents a surface suitable for highway use.

Another object is wheel carrying a flange which may be retracted into the wheel tread by mechanism easily adapted to operate the flanges of a plurality of wheels and actuable either by hand or suitable power means.

Other objects and advantages will be apparent from the following description, wherein reference is made to the accompanying drawings illustrating a preferred embodiment of my invention, and wherein similar reference numerals designate similar parts throughout the several views.

In the drawings:

Figure 1 is a view, partly in section and partly in elevation, of a pair of wheels showing the flange operating mechanism.

Figure 2 is a similar view of a single wheel showing the flange withdrawn.

Figure 3 is a section on line 3—3 of Figure 1.

Figure 4 is a section on line 4—4 of Figure 2.

Figures 5 and 6 are perspective views of details.

Referring first to Figures 1 and 2, these show railroad car structure including a cross member 10, vertical portions 11, and bearing boxes 12, all represented graphically. There is further shown an axle 15 near the ends of which are fixed wheels, indicated as a whole at 16, which wheels may be provided with a suitable cylindrical or frusto-conical tread 17 for use upon rails 18. The inner walls of the wheels 16 are preferably provided with a central axial recess 20, the purpose of which will appear later.

The axle 15, at least for a portion of its length from the bottom of recess 20 toward the middle, is shown as of square or other angular cross section, as shown in Figures 1 and 4, and slidably mounted upon this angular portion is a cam carrier 25, shown in perspective in Figure 5. This carrier 25 is provided with a plurality (in the form shown—four) radial undercut slots 26 in one end face for the reception of cam plates 27, such as shown in Figure 6. These cam plates 27 are each provided with a diagonally arranged cam slot 28.

When the plates 27 are assembled with the carrier 25 by sliding their T-shaped slides 29 into the slots 26, they may be moved into and out of the recess 20 by sliding the carrier 25 along the axle 15.

Against the inner face of wheel 16 are shown four flange sections 35, each being fan shaped and forming somewhat less than one quarter of the complete flange and each having at the corner toward the center of the wheel, lugs 36, embracing one of the cam plates 27, the pin 37 passing through the lugs 36 and cam slot 28.

These flange sections 35 are held in place and guided by a plate 40 the edge of which forms part of the tread of the wheel and which plate is fixed to the wheel 16 by bolts 41 passing through the sections 35 through slotted openings 42, which openings permit the movement of the sections and also serve as guides.

With the carrier 25, plates 27, and flange sections 35 assembled as shown, movement of the carrier along axle 15 will, through the action of the diagonal cam slots 28 and pins 37, cause the flange sections 35 to move from one of the positions shown in Figures 1 and 2, to the other position, i. e., provide either a flanged wheel or one with a flat tread.

In order to provide for the actuation of carrier 25, it is shown as provided with a groove 51 in which may be a suitable slip ring 52 carried by a yoke 50 suspended from the car structure as at 53 by means permitting a limited vertical movement to provide against breakage due to spring action.

The yoke 50 may be operated by a pitman 55 pivoted at one end to the yoke and at its other end to an arm 56 fixed upon a shaft 57 rotatable by suitable means (not shown). It is preferred (as indicated) to provide duplicate mechanism for the wheel at the other end of the axle and to operate both simultaneously.

Shaft 57 is preferably supported from the car body or frame member 10 in any suitable manner as by the braces 58 and obviously may extend to and operate a plurality of pairs of wheel flanges simultaneously.

While it will be apparent that the illustrated embodiment of the present invention herein disclosed is well calculated to adequately fulfill the objects and advantages primarily stated, it is to be understood that the invention is susceptible to variation, modification and change within the spirit and scope of the subjoined claim.

What I claim is:

A convertible car wheel including a wheel body having a tread, a plate having an arcuate edge slidably mounted within said body and intermediate the sides of said tread and arranged to project its arcuate edge beyond said tread in one extreme of its movement and to have said edge withdrawn to within the line of the tread at its other extreme of movement, and means to cause sliding movement of said plate, said means comprising a cam block having a diagonally arranged cam slot therethrough and movable axially of the wheel body, a cam follower consisting of a pin extending through said slot and carried by the plate and means for moving said block axially of said wheel.

JAMES C. MOCK.